(12) United States Patent
Hanot

(10) Patent No.: US 7,476,094 B2
(45) Date of Patent: Jan. 13, 2009

(54) PLASTIC MATERIAL METERING SYSTEM FOR PLASTIC ARTICLES MANUFACTURING DEVICE

(75) Inventor: Dominique Hanot, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 190 days.

(21) Appl. No.: 10/587,519

(22) PCT Filed: Jan. 14, 2005

(86) PCT No.: PCT/IB2005/050162

§ 371 (c)(1),
(2), (4) Date: Jul. 27, 2006

(87) PCT Pub. No.: WO2005/072051

PCT Pub. Date: Aug. 11, 2005

(65) Prior Publication Data

US 2007/0148277 A1    Jun. 28, 2007

(30) Foreign Application Priority Data

Jan. 29, 2004   (CH)   ................................. 0129/04

(51) Int. Cl.
*B29C 47/06* (2006.01)
*B29C 47/22* (2006.01)

(52) U.S. Cl. .................. 425/132; 222/249; 222/501; 264/514; 264/540; 425/133.1; 425/532; 425/381; 425/462; 425/465; 425/466

(58) Field of Classification Search .............. 425/132, 425/133.1, 532, 381, 462, 465, 466; 264/514, 264/540; 222/249, 501
See application file for complete search history.

(56) References Cited

U.S. PATENT DOCUMENTS 3,090,994 A * 5/1963 Stenger .................... 264/328.8

(Continued)

FOREIGN PATENT DOCUMENTS

FR   1 601 290   8/1970

(Continued)

OTHER PUBLICATIONS

Patent Abstracts of Japan, vol. 1995, No. 05, Jun. 30, 1995 & JP 07 040400, Feb. 10, 1995.

(Continued)

*Primary Examiner*—Robert B Davis
*Assistant Examiner*—Joseph Leyson
(74) *Attorney, Agent, or Firm*—Nixon & Vanderhye P.C.

(57) ABSTRACT

The invention relates to a plastic metering system in a device for producing plastic articles, comprising a metering unit (1) forming a block (2) comprising a material feed duct (10), a metering cavity (4) which may communicate with the said material feed duct (10), a material outlet orifice (5) placed on a wall of the said metering cavity (4), and a valve (3) in the form of a cylindrical rod designed to slide through and close off the said material outlet orifice (5), characterized in that the metering unit (1) furthermore includes a piston (7) mounted so as to slide coaxially around the valve (3) so as to allow the volume of the metering cavity (4) to be varied and the material feed duct (10) to be momentarily closed off. The invention also relates to a method for using the said system.

12 Claims, 21 Drawing Sheets

U.S. PATENT DOCUMENTS

| | | | |
|---|---|---|---|
| 3,372,429 A * | 3/1968 | Takeo | 425/532 |
| 3,386,132 A | 6/1968 | Fishcher | |
| 4,149,839 A * | 4/1979 | Iwawaki et al. | 425/133.1 |
| 4,152,104 A * | 5/1979 | Przytulla et al. | 425/462 |
| 4,297,092 A * | 10/1981 | Goron | 425/133.1 |
| 4,422,838 A * | 12/1983 | Iwawaki et al. | 425/380 |
| 4,444,702 A * | 4/1984 | Thomas et al. | 264/412 |
| 4,874,305 A * | 10/1989 | McGill et al. | 425/131.1 |
| 4,959,001 A | 9/1990 | Langlois et al. | |
| 5,256,051 A | 10/1993 | Langos et al. | |
| 5,281,384 A | 1/1994 | Banks | |
| 5,645,873 A | 7/1997 | Carter, Jr. | |
| 5,900,260 A * | 5/1999 | Hsu et al. | 425/532 |

FOREIGN PATENT DOCUMENTS

| | | |
|---|---|---|
| FR | 2 299 957 | 9/1976 |
| GB | 1 199 445 | 7/1970 |
| WO | WO 2004/026556 | 4/2004 |

OTHER PUBLICATIONS

Patent Abstracts of Japan, vol. 1996, No. 02, Feb. 29, 1996 & JP 07 266379, Oct. 17, 1995.

International Search Report of PCT/IB2005/050162, May 29, 2006.

Written Opinion of the International Searching Authority of PCT/IB2005/050162, Oct. 2, 2006.

* cited by examiner

PLASTIC MATERIAL METERING SYSTEM FOR PLASTIC ARTICLES MANUFACTURING DEVICE

This application is the US national phase of international application PCT/IB2005/050162 filed 14 Jan. 2005 which designated the U.S. and claims benefit of CH 00129/04, dated 29 Jan. 2004, the entire content of which is hereby incorporated by reference.

FIELD OF THE INVENTION

The present invention relates to the field of plastic metering systems incorporated into devices for producing plastic articles.

PRIOR ART

Such metering systems are disclosed in the following patent documents: U.S. Pat. No. 4,943,405 (AISA), U.S. Pat. No. 4,352,775 (Karl Mägerle) and WO 03/047823 (SACMI).

The metering system is incorporated into a machine producing tubes, for example for toothpaste or cosmetics. A metering unit deposits in a mould a precise quantity of plastic needed for moulding the shoulder (conical part and orifice of the tube). The shoulder is usually formed by a compression-moulding process.

The metering system includes a plastic feed duct, the metered doses of plastic being obtained by closing off the plastic feed duct.

Patent U.S. Pat. No. 6,045,736 (AISA) describes a metering unit that includes a cavity communicating with a material feed duct, the bottom of the cavity having a material outlet orifice that can be closed off by means of a sliding valve in the form of a rod.

Current metering systems have, however, a number of drawbacks.

In U.S. Pat. No. 6,045,736 for example, because of the asymmetry of the feed duct relative to the cavity, the distribution of the material around the valve is not uniform. This results in the production of asymmetric doses of material. More generally, the doses obtained with the current systems are always of a relatively asymmetric shape and they may vary in mass or volume.

SUMMARY OF THE INVENTION

The present invention has in particular the advantage of solving the aforementioned problems. It relates to a system comprising a metering unit forming a block comprising a material feed duct, a metering cavity which may communicate with the material feed duct, a material outlet orifice placed on a wall of the metering cavity, and a valve in the form of a cylindrical rod designed to slide through and close off the material outlet orifice, the metering unit further including a piston mounted so as to slide coaxially around the valve so as to allow the volume of the metering cavity to be varied, wherein the side wall of the piston has a through-passage suitable for permitting material to be conveyed between the material feed duct and the inside of the piston, the valve being designed to momentarily close the through-passage, and to a method of using the system or metering unit.

The system according to the invention makes it possible to produce doses of plastic, the mass of which is precise and the shape is regular right from the first metering.

Preferably, the metering system consists of an extruder, a plastic feed channel, an accumulator and a metering block with one or more nozzles.

Although the system has several nozzles, each may be actuated independently of the others, and they can be adjusted in order to deliver the same or different quantity of material.

The invention will now be described below in greater detail by means of a non-limiting embodiment.

LIST OF THE NUMERICAL REFERENCES

Figure 1:
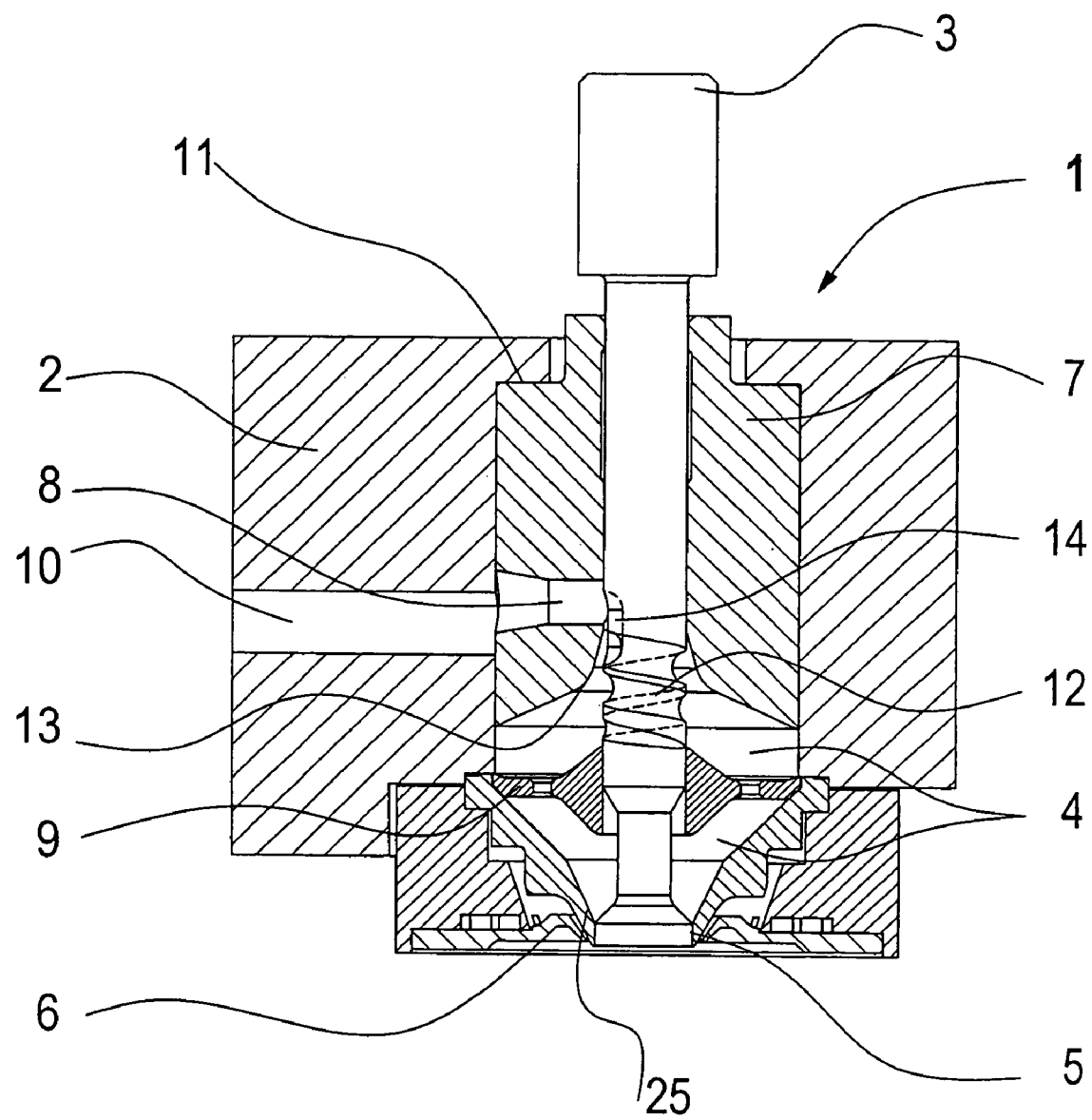
FIG. 1 shows a metering unit in the rest position.

1. Metering unit
2. Block
3. Valve
4. Metering cavity
5. Material outlet orifice
6. Cover
7. Piston
8. Piston passage
9. Breaker plate
10. Material feed duct
11. Stop
12. Helical groove
13. Conical bore of the piston
14. Straight groove
15. Accumulator (1st type, side view)
16. Accumulator (1st type, top view)
17. Duct
18. Accumulator outlet
19. Extrusion screw
20. Accumulator piston
21. 1st accumulator outlet
22. 2nd accumulator outlet
23. 1st hose 24. 2nd hose
25. Valve seat
26. Metering unit
27. Block
28. Valve body
29. Valve bush
30. Piston
31. Valve seat
32. Breaker plate
33. Blowing cover
34. Material A feed channel
35. Material B feed channel
36. Helical groove (on valve)
37. Material B passage (on valve)
38. Material B duct (on piston)
39. Helical groove (on piston)
40. Cone
41. Material outlet orifice
42. Material B cavity
43. Material A cavity
44. Material B outlet orifice
45. Stop
46. Material A passage for internal layer
47. Material A passage on piston for external layer
48. External layer of the dose (material A)
49. Middle layer of the dose (material B)
50. Internal layer of the dose (material A)
51. Spacer for purge
52. Valve ferrule The metering nozzle shown in FIG. 1 consists of a block 2, a rod-shaped valve 3, a valve seat 25, a metering cavity 4, a breaker plate 9, a piston 7 and a blowing cover 6.

In the rest position (FIG. 1), the cavity 4 is fed with the plastic through the block 2 and the piston 7, the passage 8 in the piston 7 is open and the outlet orifice 5 is closed. The piston 7 is in the high position against the stop 11 of the block 2.

During the metering cycle, the valve 3 undergoes a linear travel generated by an actuator (not illustrated), the travel of which can be adjusted (e.g. a pneumatic cylinder).

Figure 2:
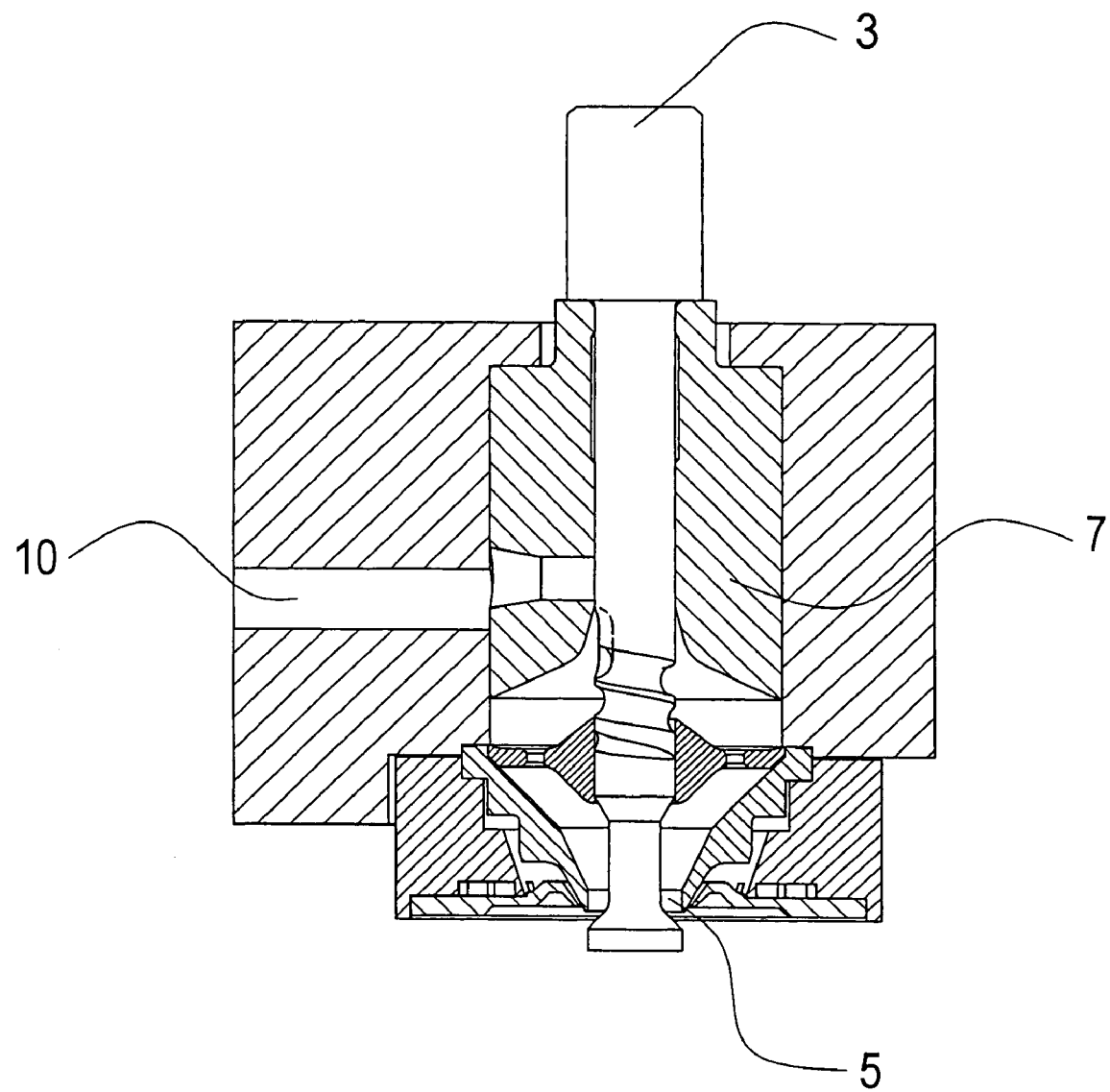
FIG. 2 illustrates the opening of the valve.

In the situation illustrated in FIG. 2, the passage of the piston 8 closes and the material outlet orifice 5 opens. The cavity 4 is then isolated from the material feed.

Figure 3:
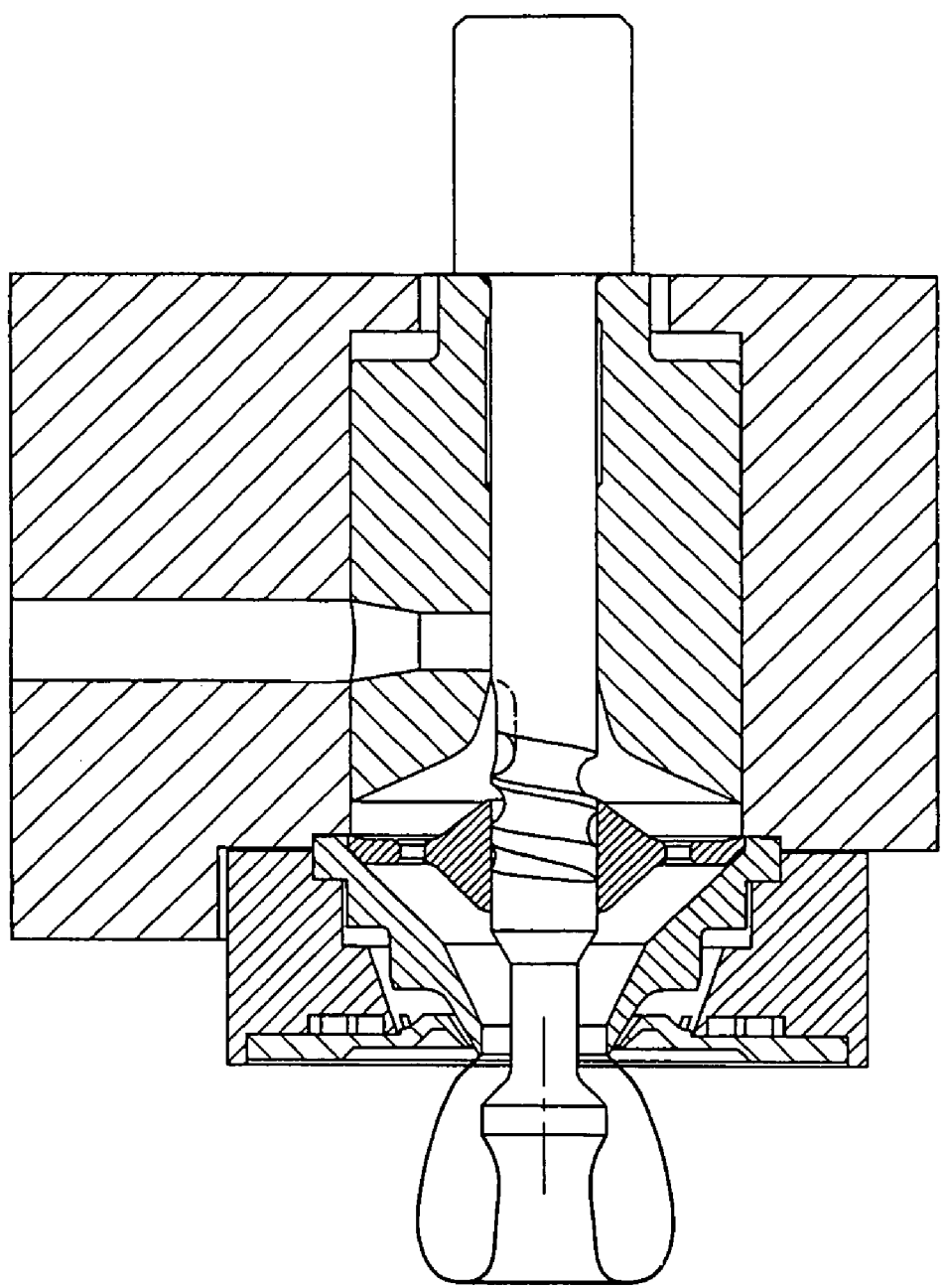
FIG. 3 illustrates the flow of a dose through the outlet orifice.

In the situation illustrated in FIG. 3, the valve 3 continues its travel and comes into abutment with the upper face of the piston 7, which it also drives until the actuator is stopped. The piston 7 expels a volume of material proportional to its travel from the cavity 4, this material flowing out via the material outlet orifice 5.

Figure 4:
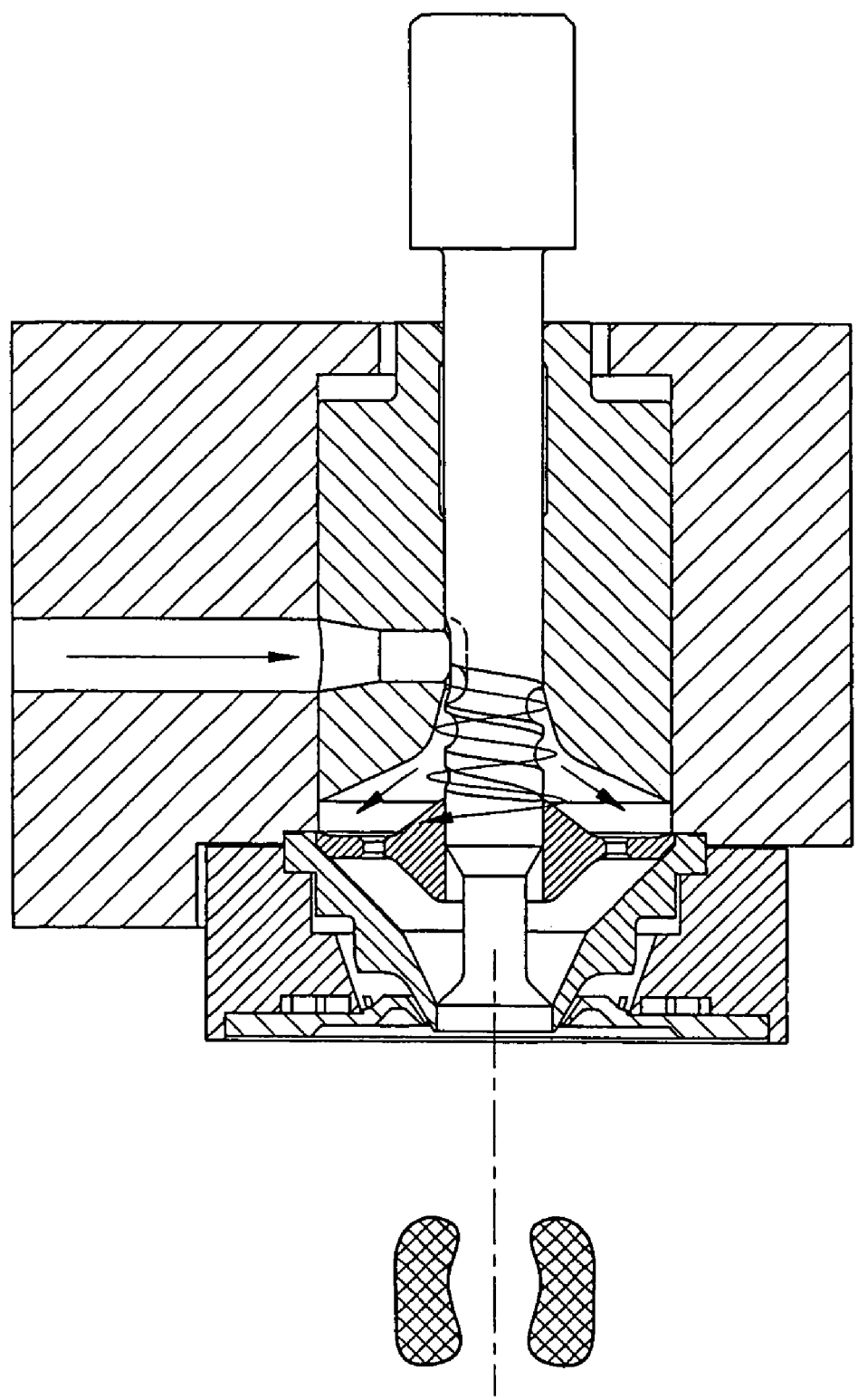
FIG. 4 illustrates the formation of a dose outside the block.

The actuator then drives the valve 3 in the opposite direction, causing the outlet orifice 5 to close and the passage in the piston 8 to open (FIG. 4). Simultaneously with the closure of the outlet orifice 5, the dose of plastic is blown off. The pressurized material in the material feed duct 10 passes through the passage 8 and pushes the piston 7 against the stop 11, this having the effect of filling the metering cavity 4 and returning the metering unit to the rest position as illustrated in FIG. 1.

The pressure of the material in the material feed duct 10 must be sufficient for the piston 7 to be raised before the next metering cycle. This metering system does not require a very precise pressure in the material—it tolerates variations in this pressure.

Figure 5:
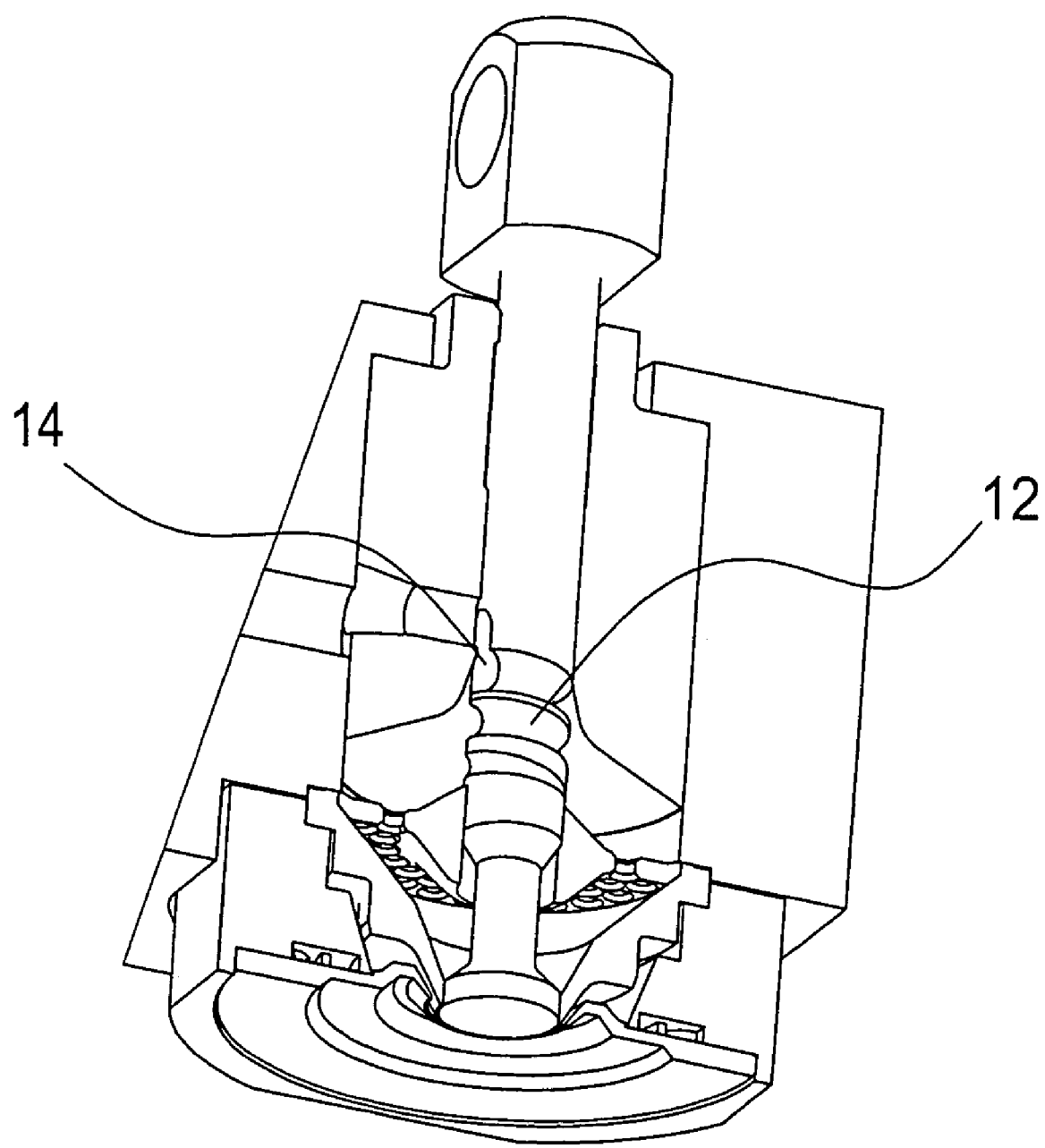
FIG. 5 shows an enlarged view of the environment of the metering cavity.

The environment of the passage 8 in the piston 7 will be described below in greater detail (see FIG. 5).

The material coming from the passage 8 arrives on the cylindrical rod of the valve 8, which has a groove of rounded cross section 12 composed of two successive portions: firstly, a straight portion and then a helical portion of decreasing depth. The corresponding bore 13 of the piston 7 is conical.

This arrangement of the material passage allows circular distribution around the seat 25 of the valve 3. The flow passes progressively from the groove 12 to the cone 13. The material arriving at the centre of the cavity 4 makes it possible to obtain a dose of material at the outlet that is very symmetrical. This system allows easier colour change.

The breaker plate 9 forces the material to flow over the entire periphery of the valve 3. It also balances the shape and distribution of the material of the dose. The breaker plate 9 can be easily removed and, depending on the type of material, may or may not be mounted.

Figure 6:
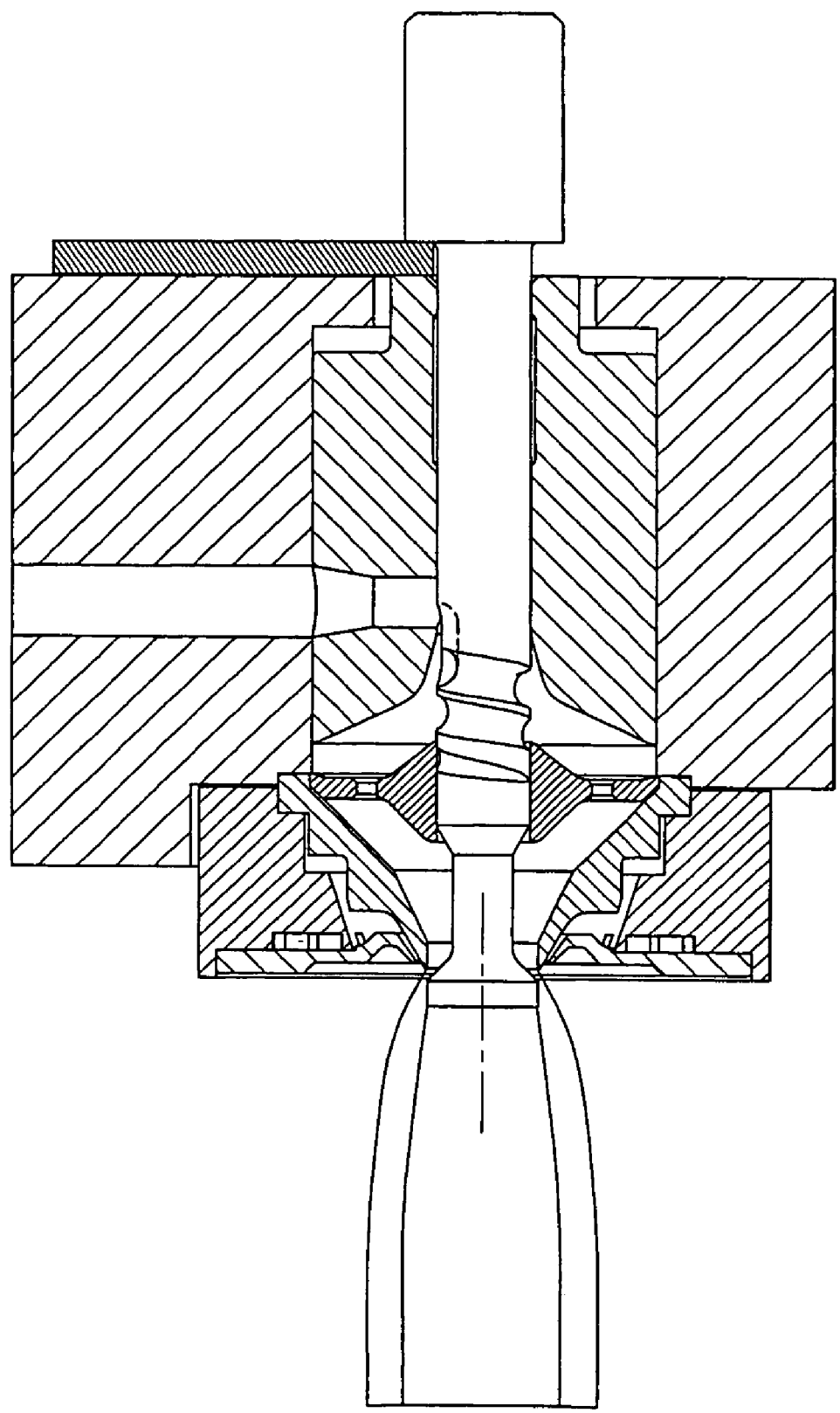
FIG. 6 shows the purge position.

Purge position (FIG. 6):

By placing a spacer between the valve and the piston, and then by opening the nozzle, the passage 8 of the piston and the outlet orifice 5 are opened, which allows the plastic to flow out continuously.

The flow of material output by the nozzle is discontinuous, and the actuation of the nozzle or nozzles is dependent on the presence of a tube body. To remedy this situation, it is preferred to use a material accumulator.

More precisely, the accumulator has several functions:
1. To maintain a constant pressure in the material feed duct 10 in order to cause the metering piston to rise;
2. To absorb part of the metering discontinuity and transmit, to the extrusion screw 19, a substantially constant speed (sinusoidal variation);
3. When the outlet orifice 5 is closed, to accumulate a quantity of plastic without stopping the extrusion screw 19; and
4. By its position, to regulate the speed of the extrusion screw: if the quantity of material accumulated decreases, the speed of the screw 19 increases and vice versa.

Figure 7:
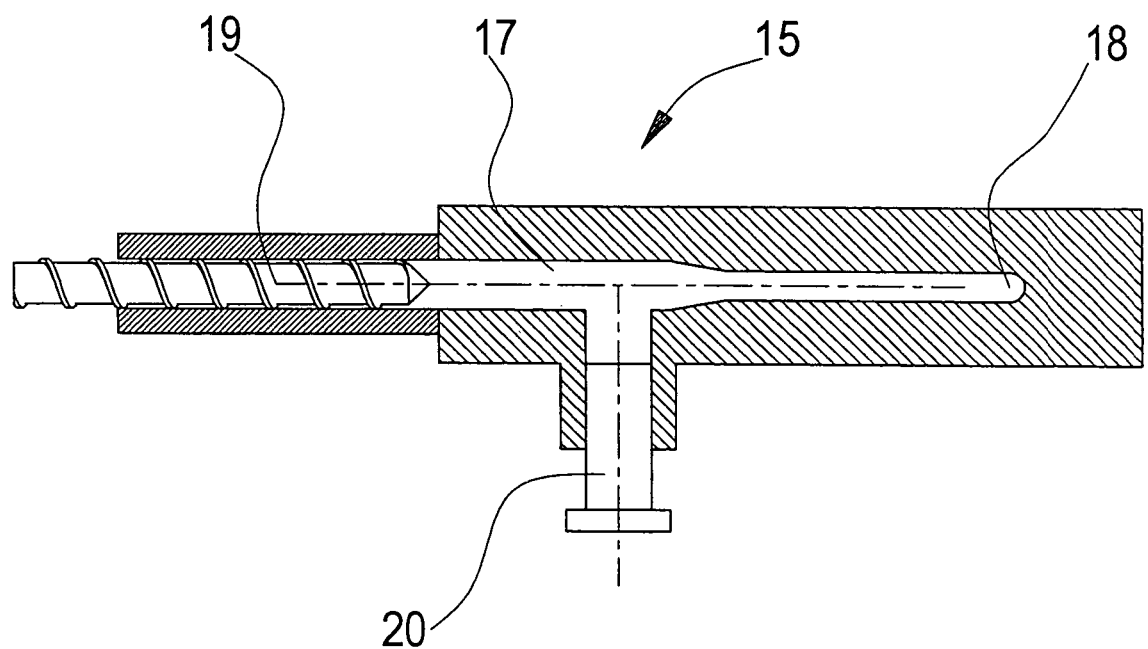
FIG. 7 shows a first type of accumulator (side view).
Figure 8:
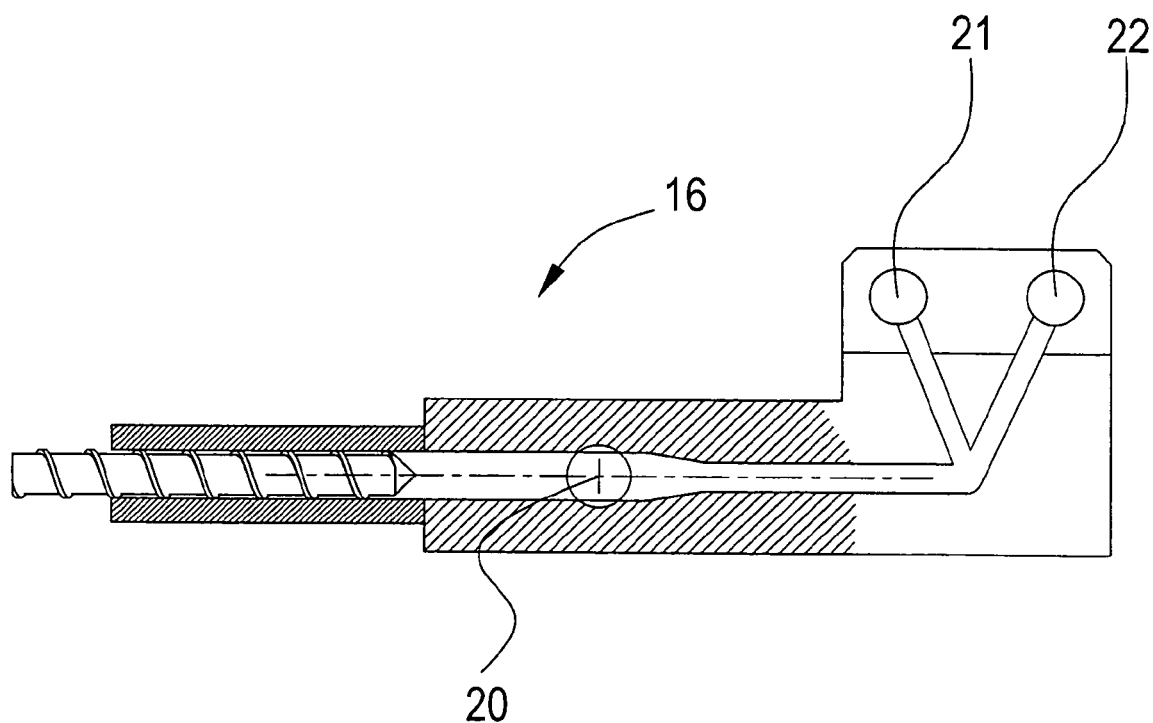
FIG. 8 shows a first type of accumulator (top view).

A first type of accumulator 15 that can be used within the context of the present invention is illustrated in FIGS. 7 and 8. A regulating piston 20 moves in a cylinder placed transversely to the duct 17 of the accumulator. The piston 20 may be arranged in various ways on the duct 17 between the end of the extrusion screw 19 and the block 2. The piston 20 may also have various shapes at its end in contact with the material. The pressure in the plastic is generated by a single-action pneumatic cylinder that transmits a constant force to the piston. Only the air pressure is controlled.

Figure 9:
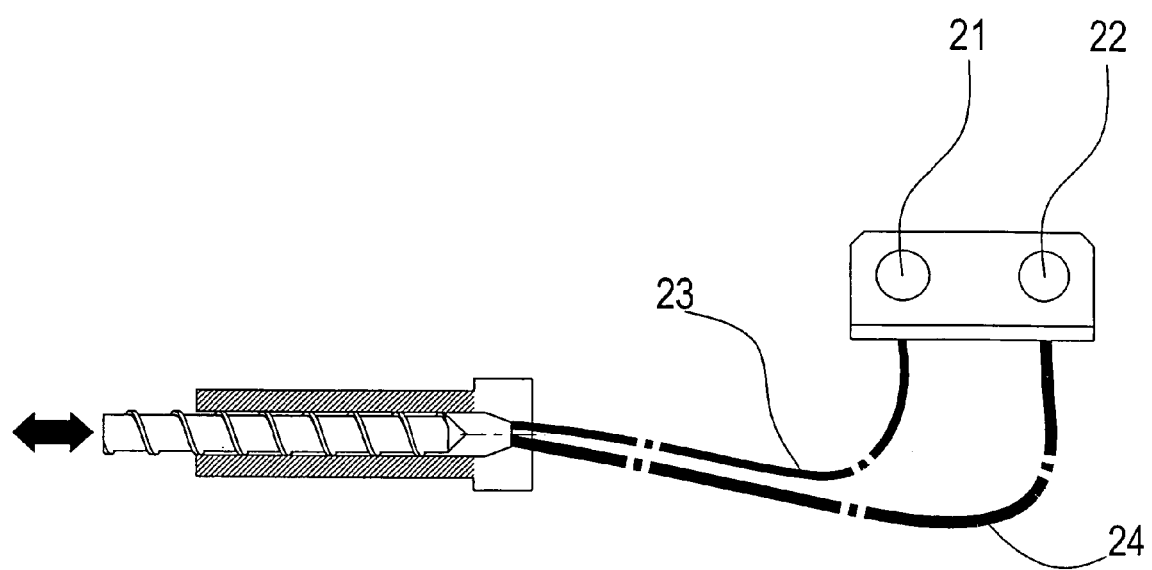
FIG. 9 shows a second type of accumulator with an alternative way of fixing the accumulator to the metering unit.
Figure 10:
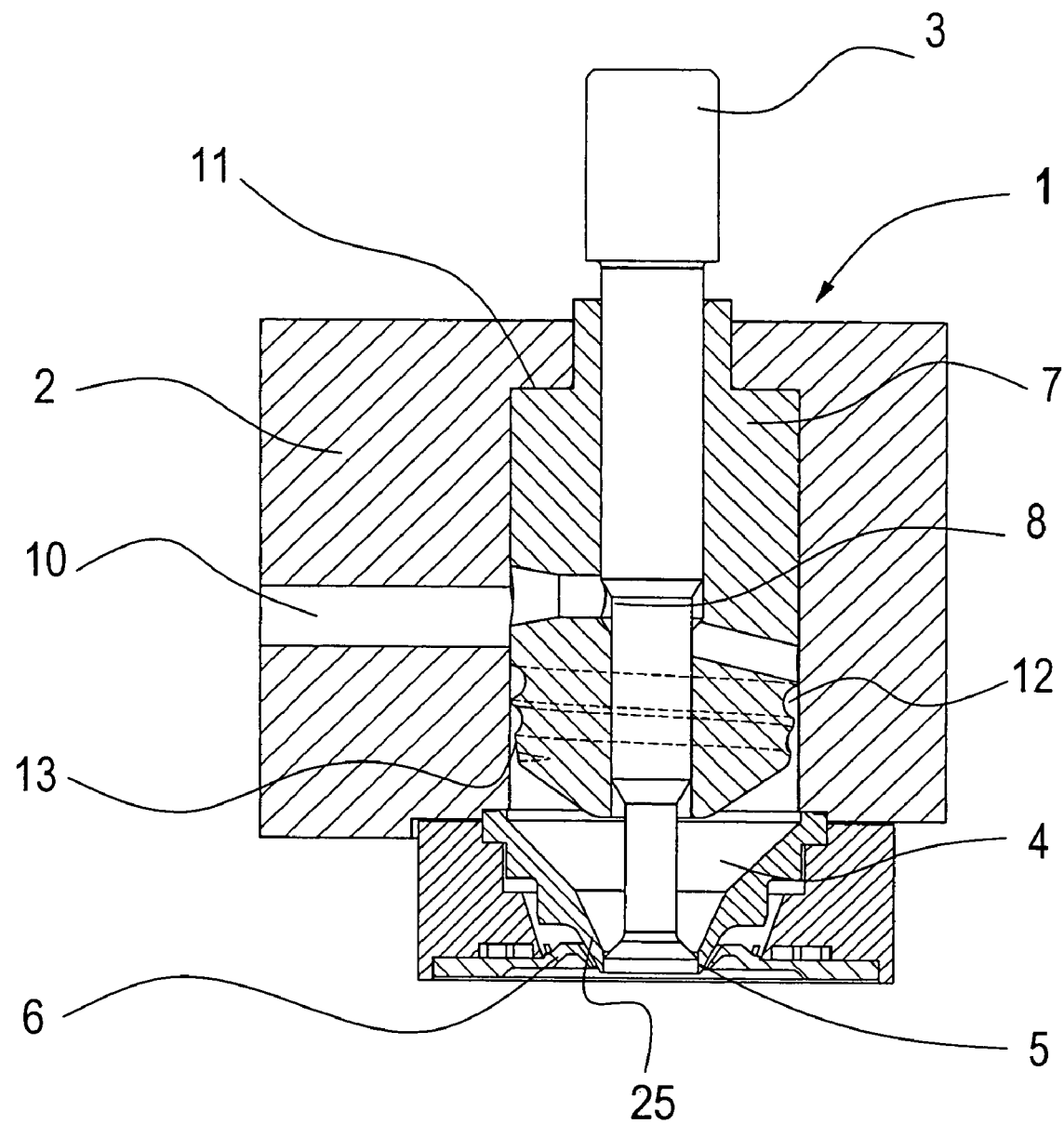
FIG. 10 shows a metering unit in the rest position.
Figure 11:
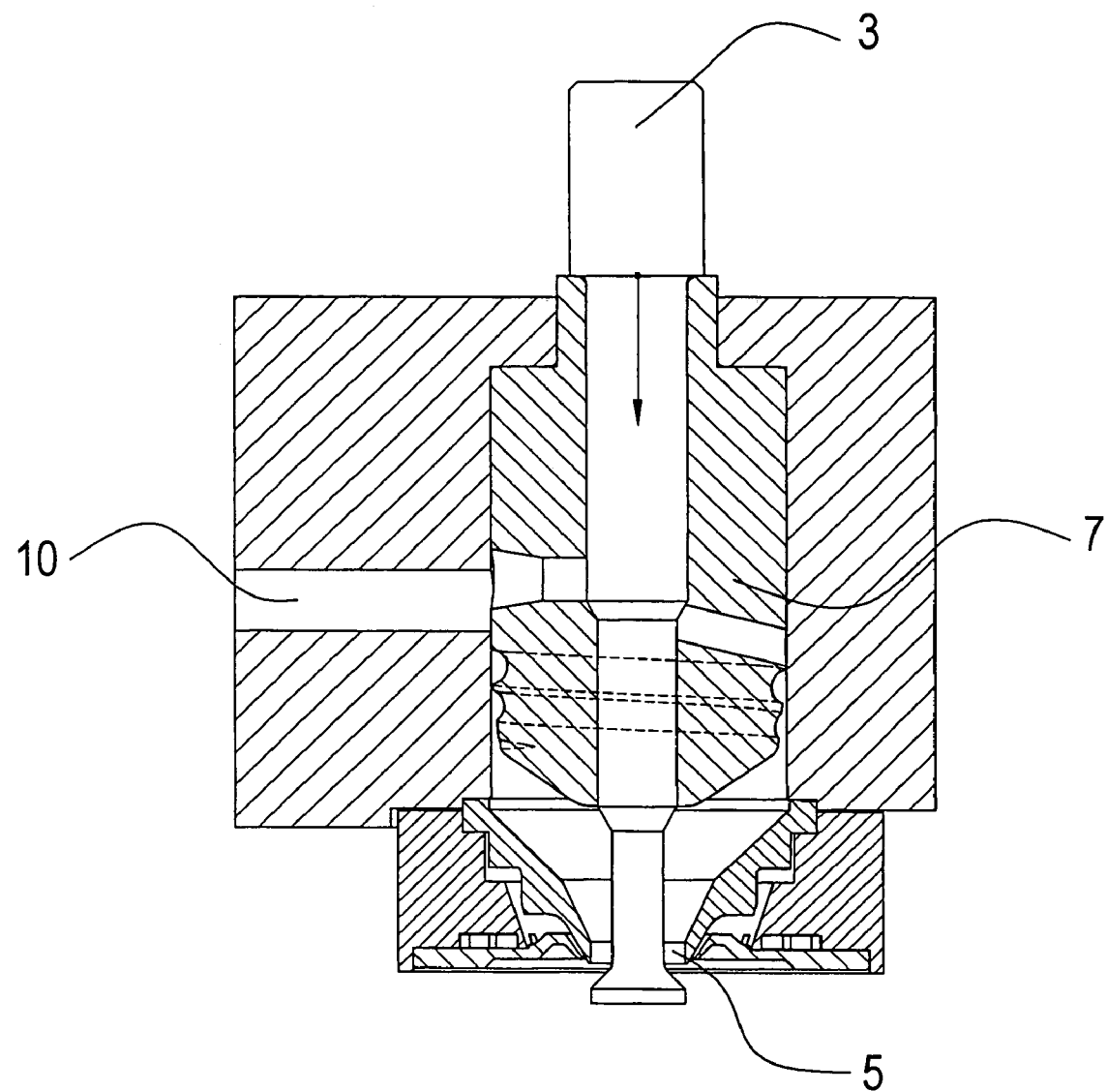
FIG. 11 illustrates the opening of the valve.
Figure 12:
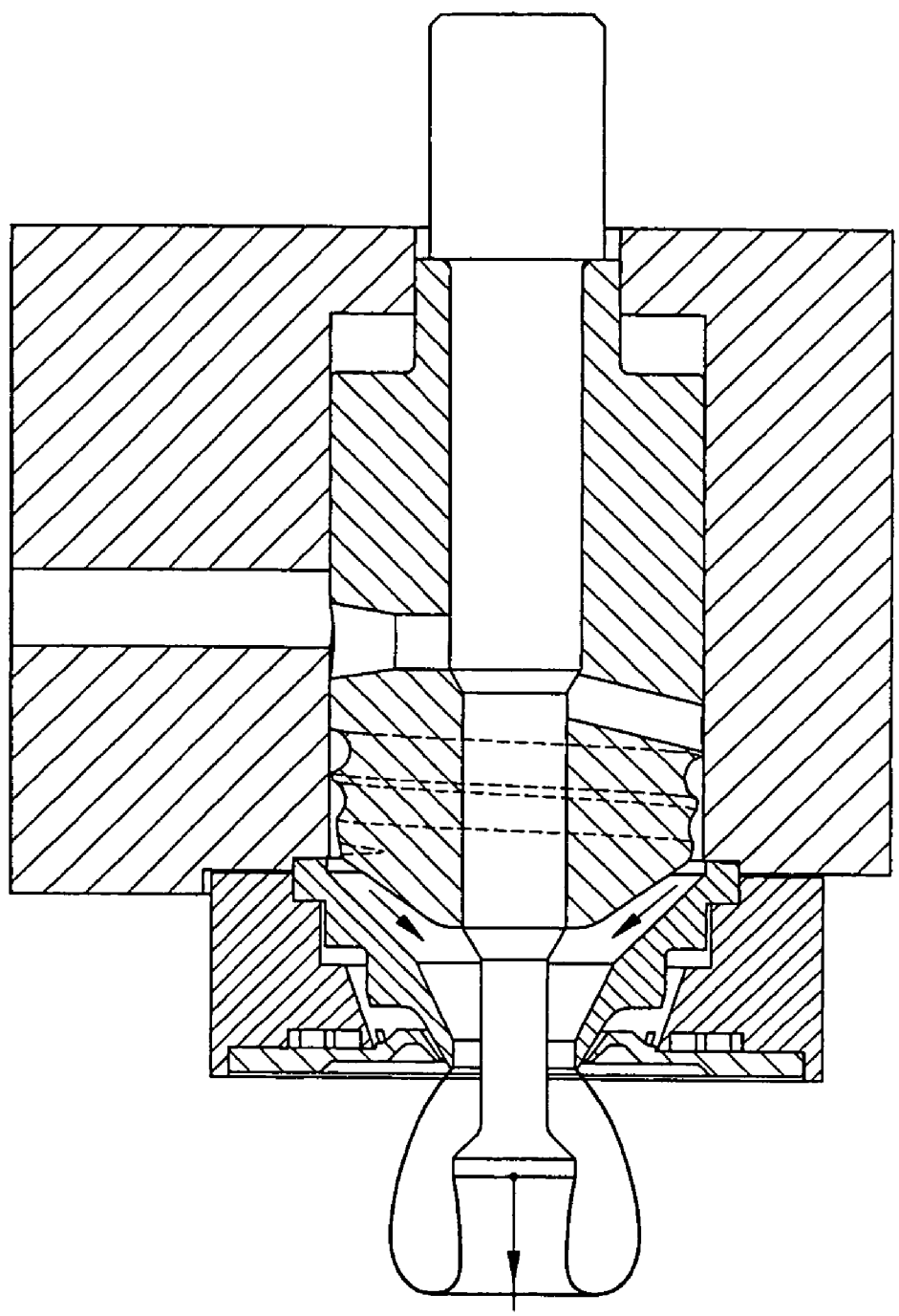
FIG. 12 illustrates the flow of a dose through the outlet orifice.
Figure 13:
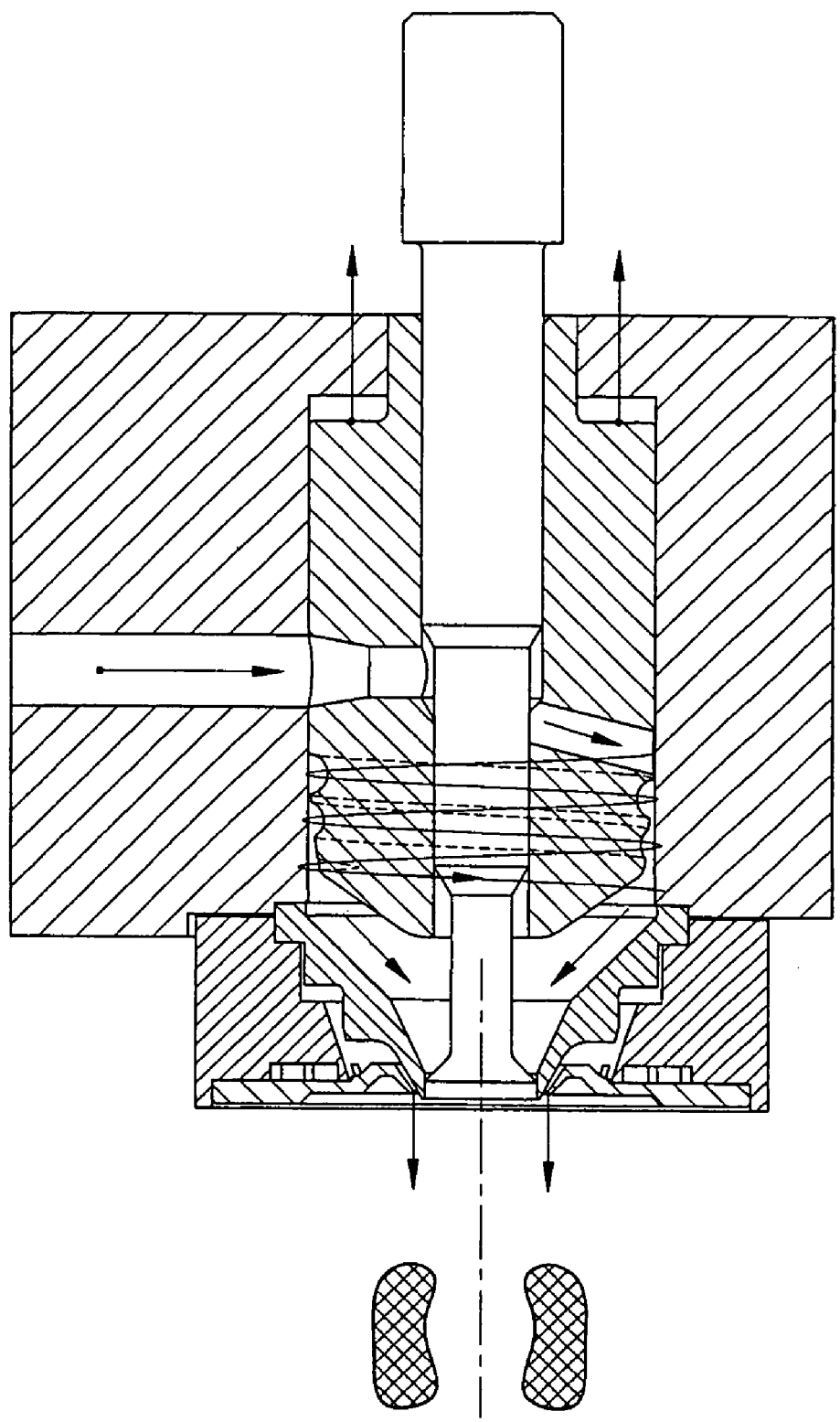
FIG. 13 illustrates the formation of a dose on the outside of the block.
Figure 14:
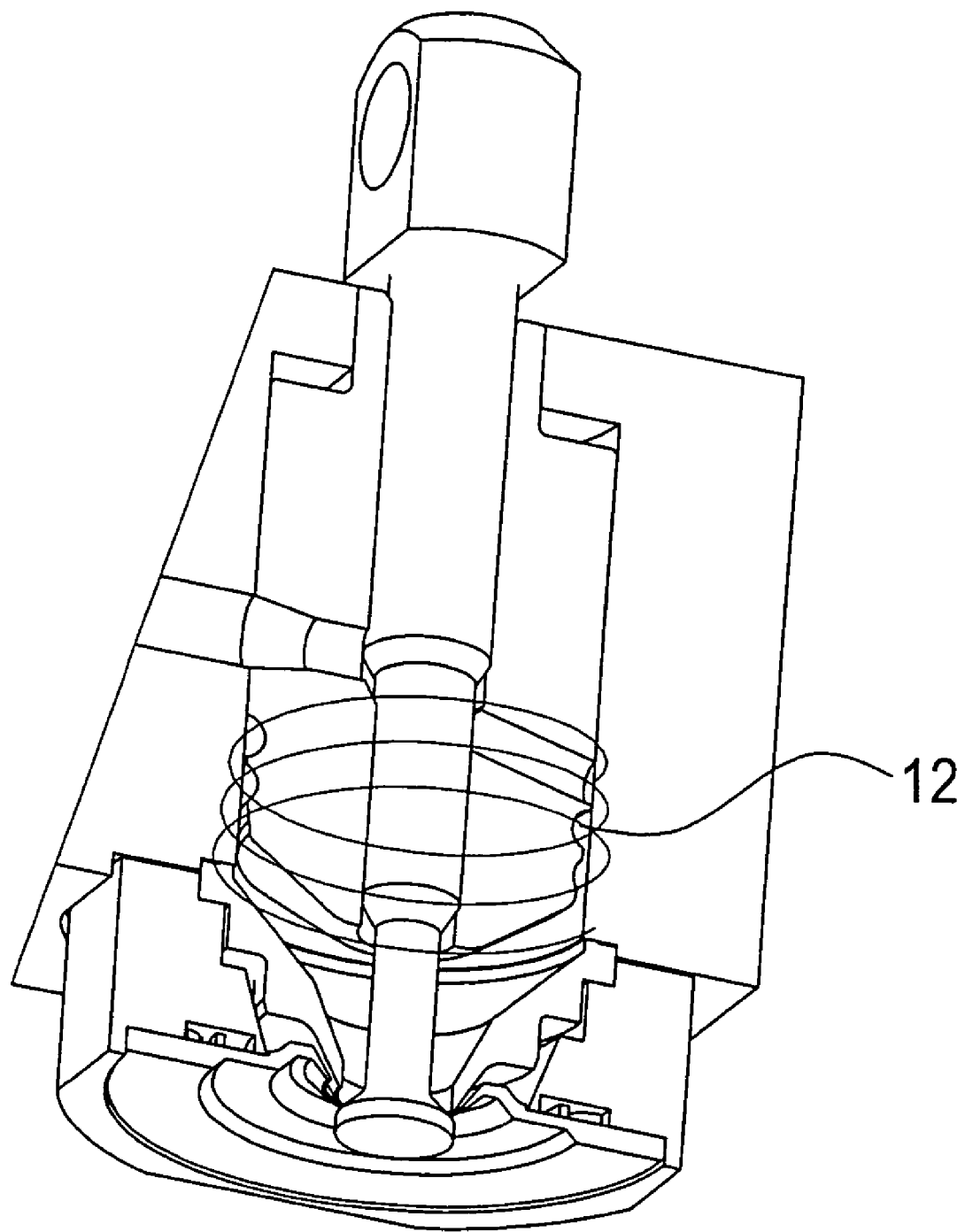
FIG. 14 shows an enlarged view of the environment of the metering cavity.
Figure 15:
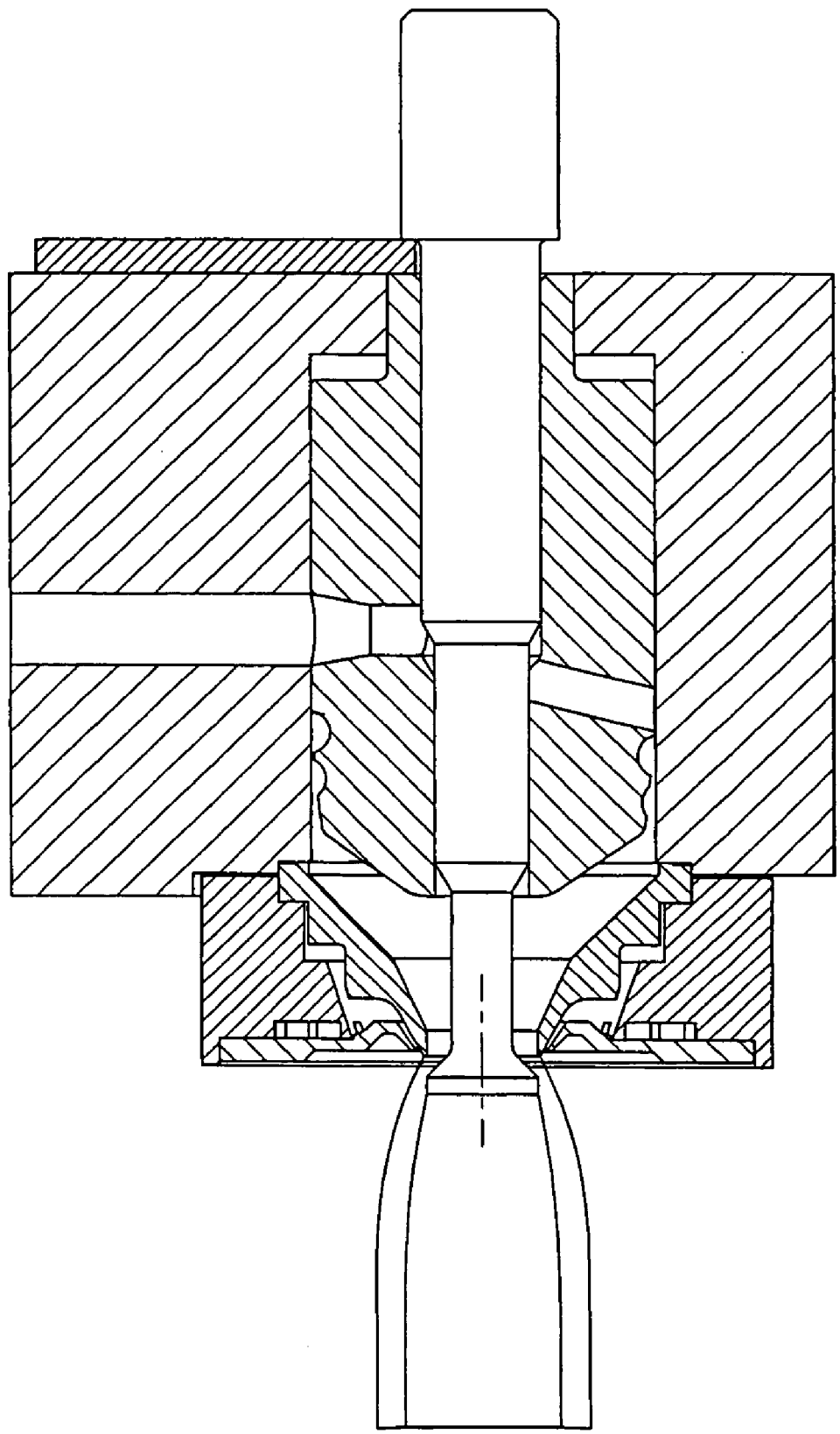
FIG. 15 shows the purge position.

FIG. 9 illustrates a different type of accumulator 16 which is characterized by axial displacement of the extrusion screw 19. The pressure in the plastic is generated by a single-action pneumatic cylinder that transmits a constant force to the extrusion screw 19. Only the air pressure is controlled. It is also possible to vary the pressure during the cycle.

This second variant offers the advantage of not creating a dead zone for the flow of material—there is no stagnation and it is easier to change material or colour.

If the accumulator functions by displacement of the extrusion screw 19, the channel connecting the outlet of the accumulator to the block may be in the form of a heated hose 23, 24. This type of hose is used for example in coextrusion to connect an extruder to a tool. The metering nozzles operating with a relatively low pressure allow this type of connection to be used. There may be as many hoses 23, 24 as there are metering nozzles.

This configuration has in particular the following advantages:
the flexible link allows the position of the block 2 to be easily adjusted;

uniform heating along the hose, the heater being all around the circumference;

better material flow, it being possible for the internal tube to be made of PTFE, and sharp angles and changes of direction are replaced by curves;

changes in material or colour are facilitated—no stagnation zone;

multiple delivery with several nozzles is simplified;

tool change and maintenance are simplified.

FIGS. 10 to 15 describe another embodiment of the invention. The piston has a passage 8 which passes diametrically through it and emerges in a helical groove 12 of rounded cross section and of decreasing depth. In addition, this groove is made on the outer surface of the piston 7, which is conical 13.

At the intersection with the passage 8, the valve 3 has a diameter reduction with a conical transition. The piston has the same shape, but is negative. This arrangement produces a shutter. In the open position (FIGS. 10, 13, 14 and 15), the material can pass into a space created around the valve and feed the helical groove 12 and the metering cavity 4. In the closed position (FIGS. 11 and 12), the space around the valve disappears and the material cannot pass. This space around the valve, which varies during the cycle, is an advantage when changing material, no stagnation effect being possible.

When the dose is formed and blown off (FIG. 13), the valve 3 is in the high position, the passage 8 is open, and the material feeds the cavity 4. The pressurized material flows into the helical groove 12 and progressively runs away over the cone of the piston 7. At the same time, the piston rises up to the stop 11. The material is distributed uniformly around the circumference of the piston and feeds the cavity 4 from the outside towards the centre. This phenomenon is important for replenishing the material and avoids any stagnation. The concentric distribution from the outside towards the centre sweeps the entire volume of the cavity 4, the breaker plate not being necessary (see first variant nozzle). In this variant, the volume of the cavity 4 is smaller and the contact between piston and bore of the block 2 is reduced facing the helical groove. The force for the displacement of the piston is reduced.

The volumetric metering nozzle illustrated in FIGS. 16 to 21 is based on a volumetric principle similar to the two abovementioned variants. It makes it possible to produce a multilayer (3 layers/2 different components) annular dose. This metering system makes it possible to produce articles made of multilayer plastic and more particularly multilayer shoulders for tubes, for example for toothpaste or cosmetics. These components may be distinguished by different colours or they may be different polymers. In the specific case of shoulders for tubes, the central layer may be made of a material having gas or fragrance barrier properties. The metering nozzle is fed by two extruders, each having a material accumulator system.

The valve body 28 and the valve bush 29 are assembled by a rigid linkage (for example, they are chased or pinned). The angular position of the piston 38 in the block 27 is fixed.

In the rest position (FIG. 16), the piston 38 is in the high position against the stop 45 against the block 27. The dose is composed of three layers (FIG. 19):

external layer 48 made of material A;

central layer 49 made of material B;

internal layer 50 made of material A.

The external layer is produced by "volumetric" metering, the volume of material A being expelled from the cavity 43. The volume is defined by:

$$V_1 = \frac{\pi}{4}(D_3^2 - D_2^2) \times c$$

The central layer is made by "volumetric" metering, the volume of material B being expelled from the cavity 42. The volume is defined by:

$$V_2 = \frac{\pi}{4}(D_2^2 - D_1^2) \times c$$

$D_1$, $D_2$ and $D_3$ are the diameters of the piston (FIG. 17) and c is the travel of the piston.

By choosing the diameters it is possible to determine the proportion of V2 relative to V1: for example, it may be desired for V2=10% of V1.

The internal layer is fed directly (non-volumetrically); to adjust the volume, the pressure of material A is varied and various valve ferrules 52 used to vary the outlet flow cross section according to the layer thickness desired.

During the metering cycle, the valve 28 undergoes a linear travel caused by an actuator (not illustrated), the travel of which can be adjusted (e.g. a pneumatic cylinder).

Figure 17:
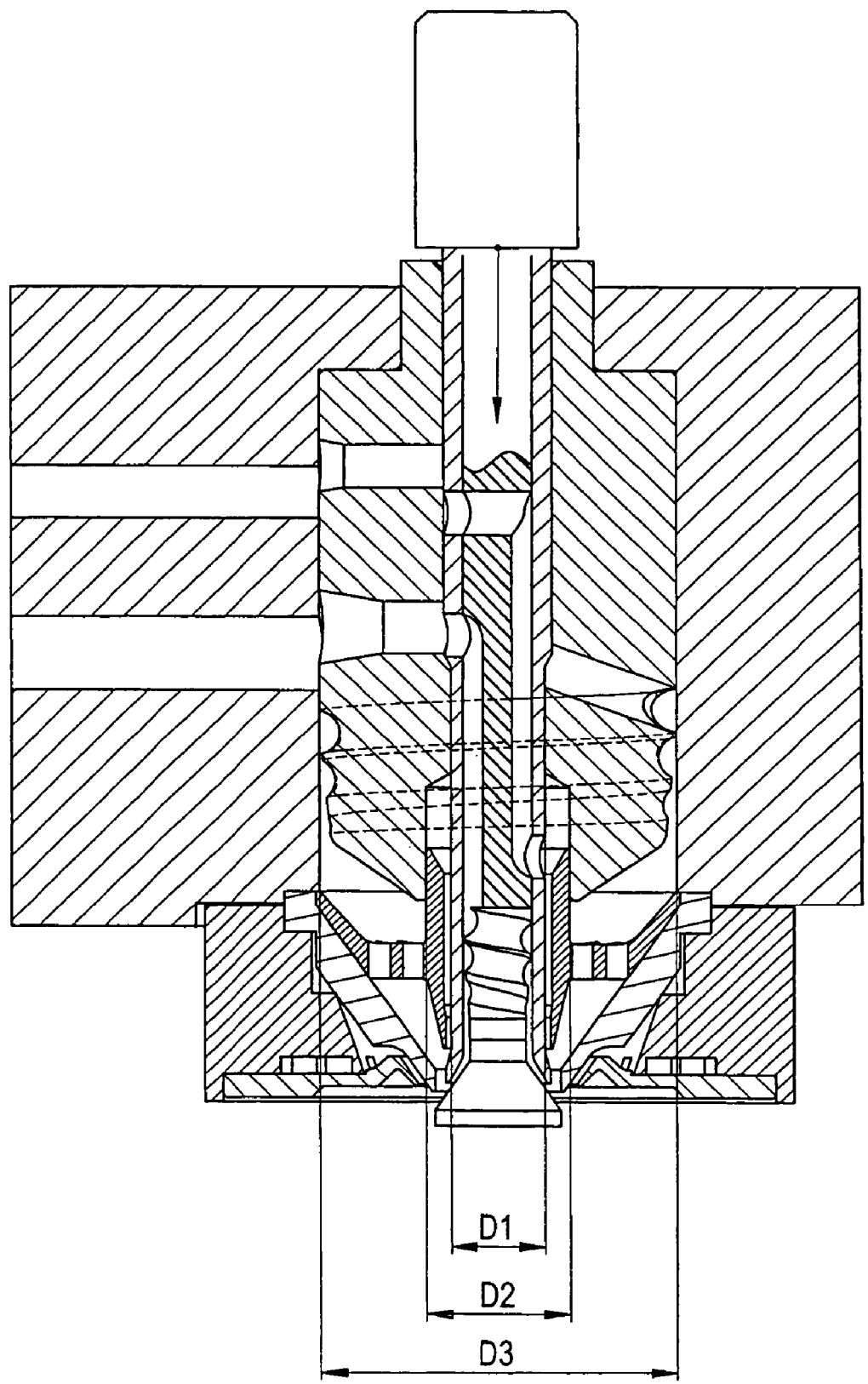
FIG. 17 illustrates the opening of the valve.

In the situation illustrated in FIG. 17, the piston passages 47 and 37 are closed and the material outlet orifices 41 and 44 are open. The cavities 43 and 42 are then isolated from the material feeds 34 and 35.

Figure 18:
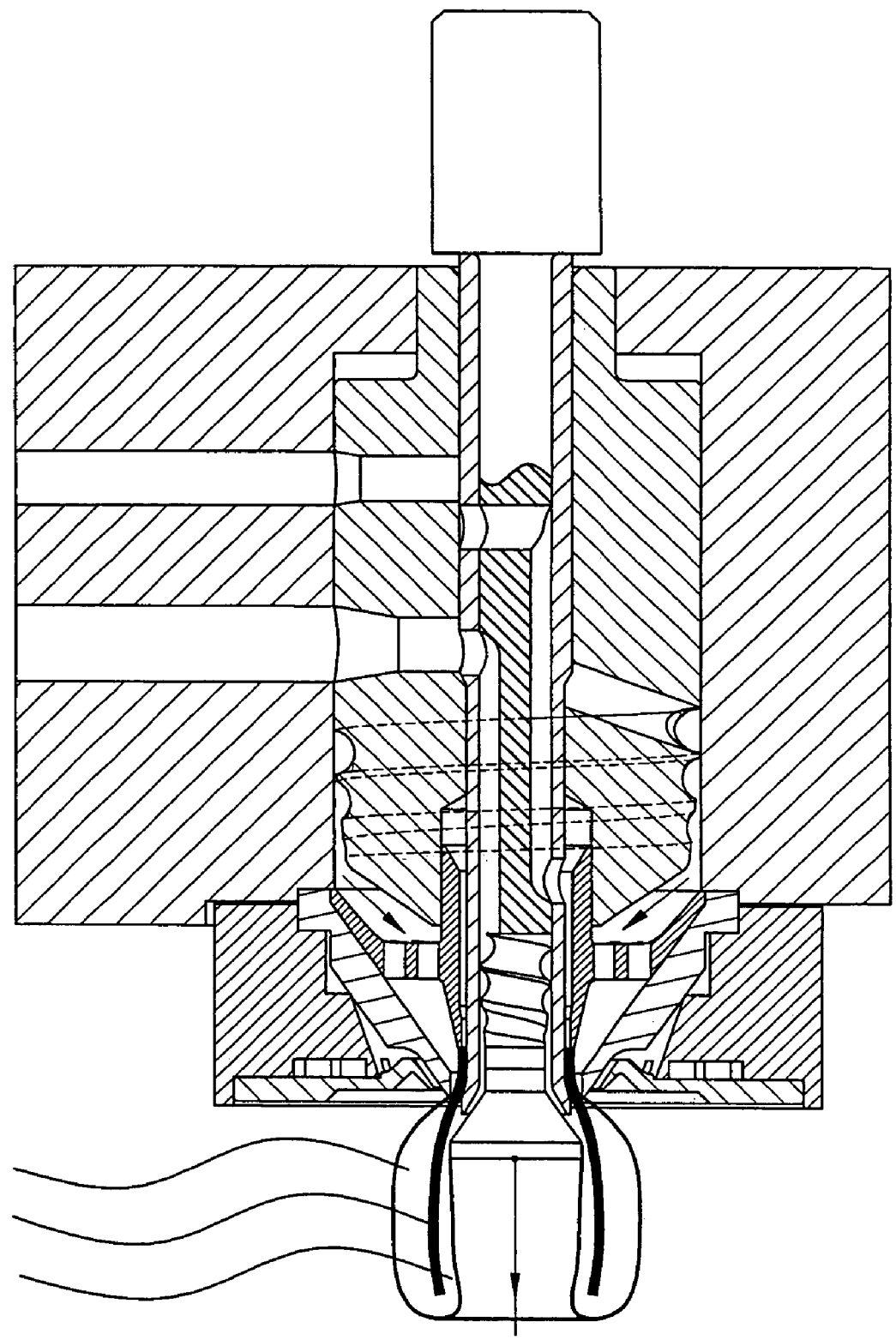
FIG. 18 illustrates the flow of a dose through the outlet orifice.

In the situation illustrated in FIG. 18, the valve 28 continues its travel and drives the piston 30 until the actuator stops. The piston 30 expels a volume ($V_1$) of material A proportional to its travel from the cavity 43, this material flowing out through the holes in the breaker plate 32 and then the material outlet orifice 41 for forming the external layer 48 (material A) of the dose. At the same time, the piston 30 expels a volume ($V_2$) of material B. which will form the central layer of the dose 49, from the cavity 42. The internal layer 50 is formed by the material A flowing out from the duct 34 through the passage 46 and the helical groove 36. Since the flow cross section 41 is substantially greater than 44, the speed of output of the external layer is greater than that of the central layer, this having the effect of encapsulating the central layer with the external layer. This means that the central layer is not visible at the end of the dose.

Figure 16:
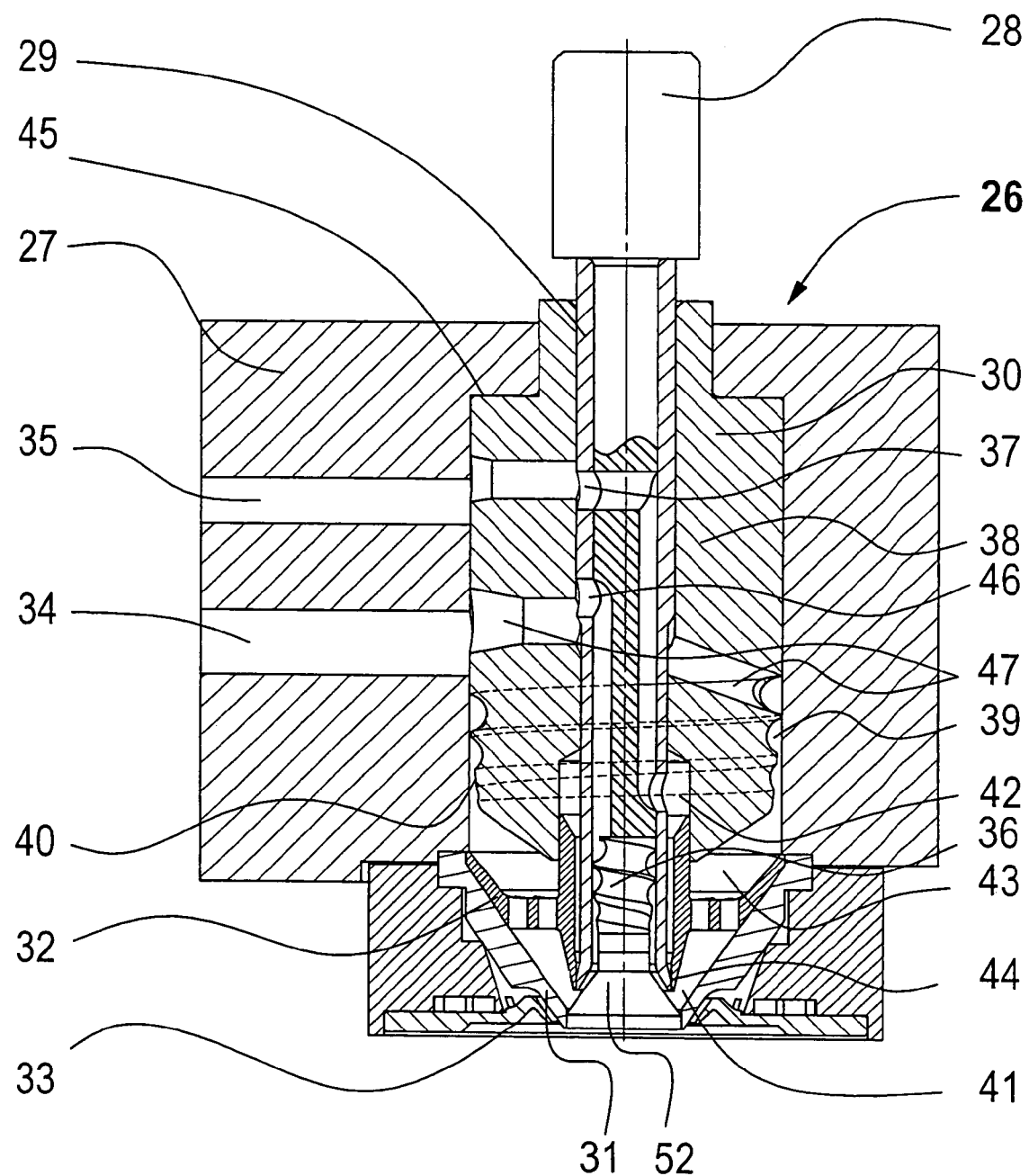
FIG. 16 shows a metering unit in the rest position.
Figure 19:
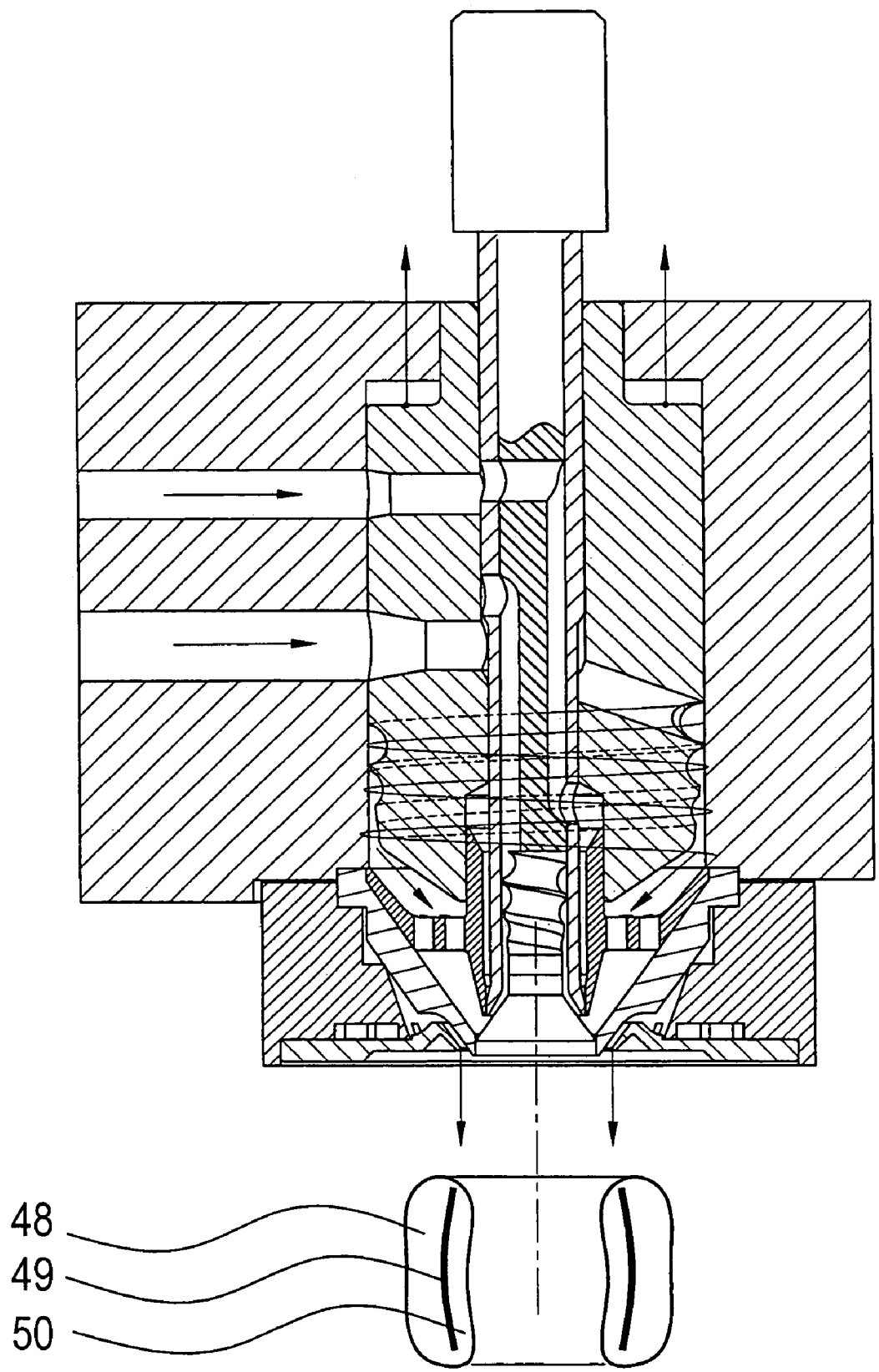
FIG. 19 illustrates the formation of a dose on the outside of the block.
Figure 20:
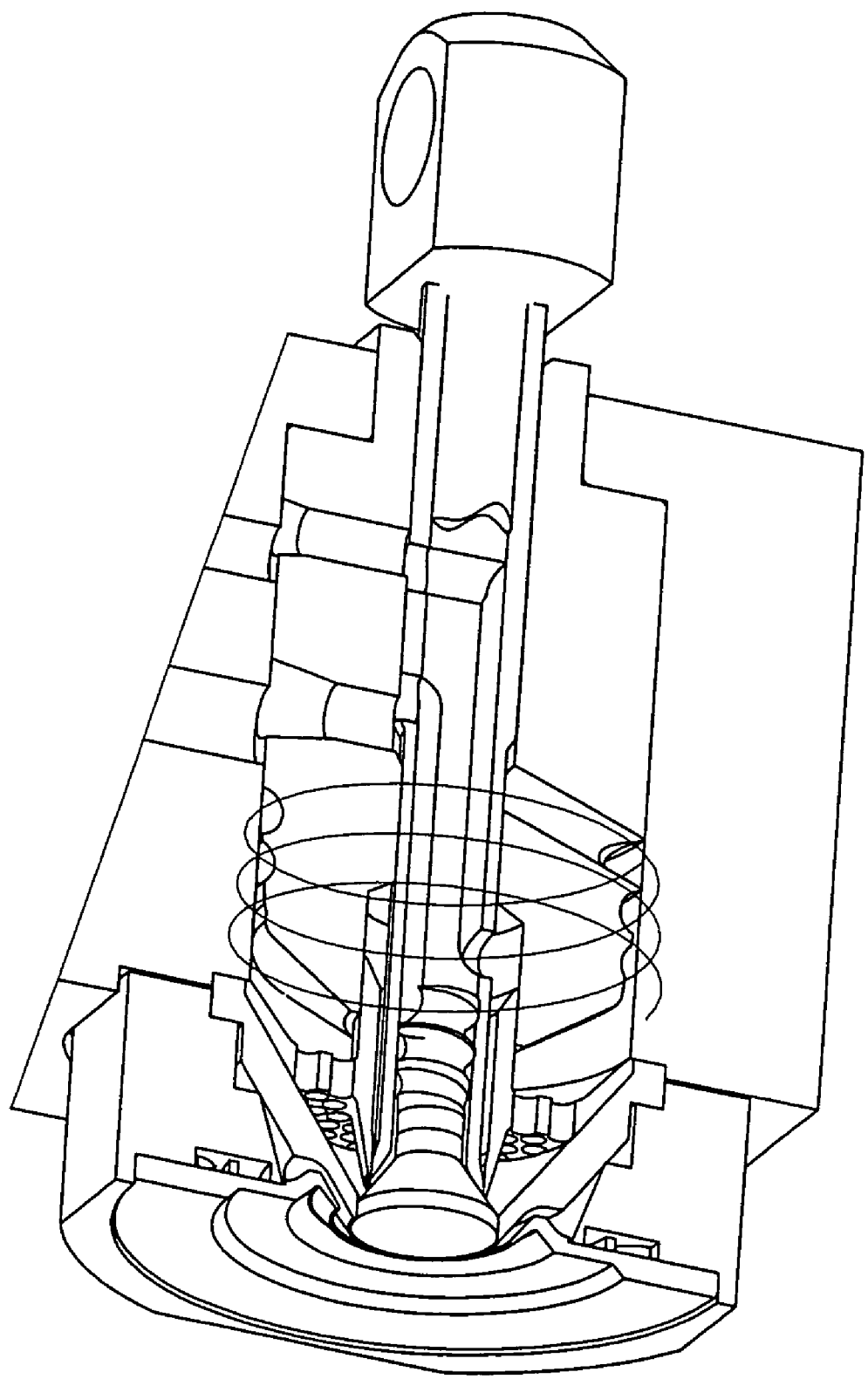
FIG. 20 shows an enlarged view of the environment of the metering cavity.
Figure 21:
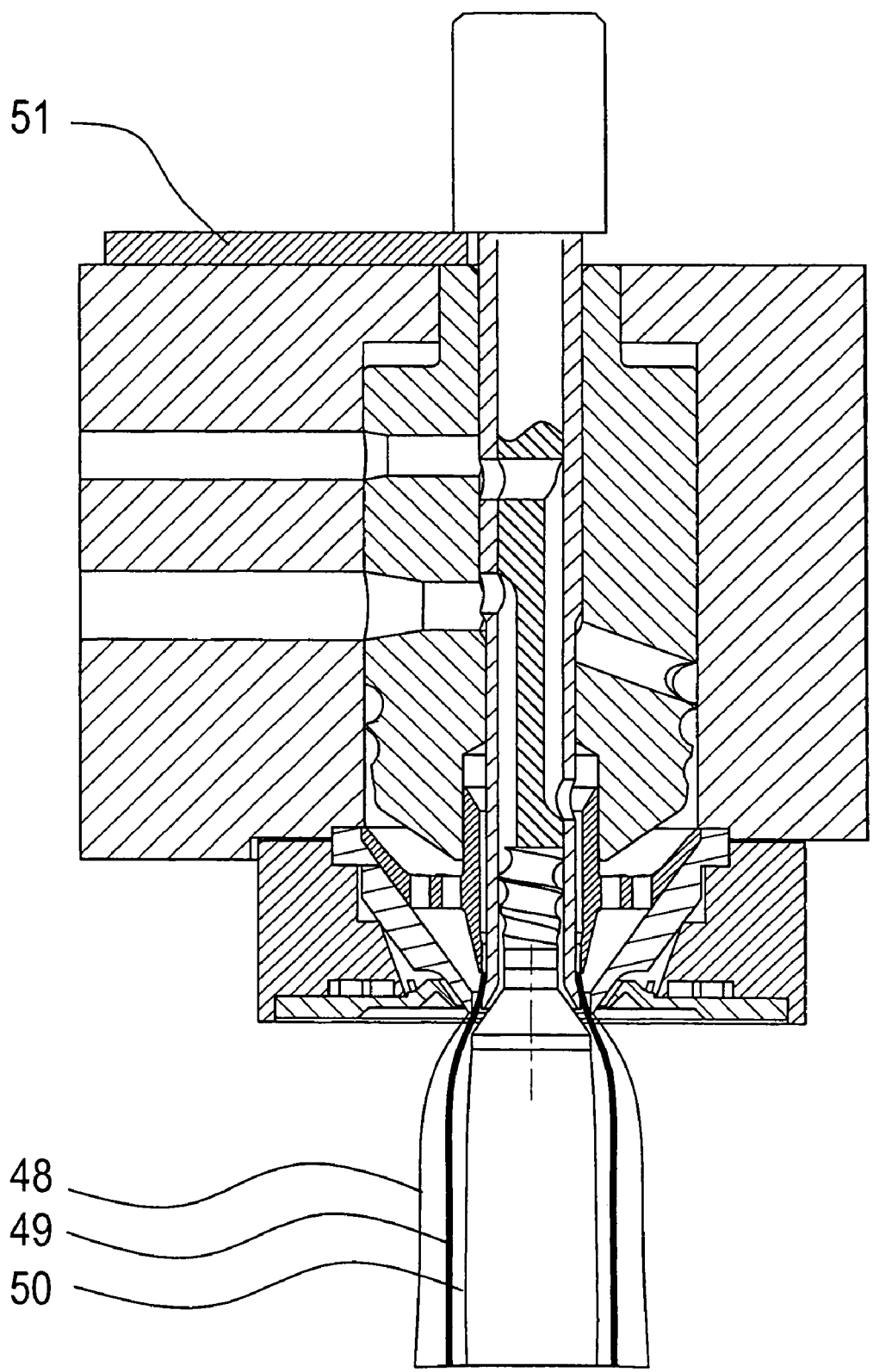
FIG. 21 shows the purge position.

The actuator then drives the valve 28 in the opposite direction, causing the outlet orifices 41 and 44 to close and the passages 37 and 47 in the piston 30 to open (FIG. 19). Simultaneously with the closure of the outlet orifices, the dose of plastic is blown off. The pressurized materials in the material feed ducts 34 and 35 pass through the passages 47 and 37 respectively and push the piston 30 against the stop 45, this having the effect of filling the metering cavities 43 and 42 and turning the metering unit to the rest position as illustrated in FIG. 16. The helical groove 39 of rounded cross section combined with the cone 40 constitutes a helical distributor such as that already described. The pressure of material in the material feed duct 34 must be sufficient for the piston 30 to be raised before the next metering cycle. As a variant, the outlet orifice 44 for the material B may be designed so as to always remain open.

The invention claimed is:

1. Metering unit forming a block comprising a material feed duct, a metering cavity which may communicate with said material feed duct, a material outlet orifice placed on a wall of said metering cavity, and a valve in the form of a cylindrical rod designed to slide through and close off said material outlet orifice, said metering unit further including a piston mounted so as to slide coaxially around the valve so as to allow the volume of the metering cavity to be varied, wherein the side wall of the piston has a through-passage suitable for permitting material to be conveyed between said material feed duct and the inside of the piston, said valve being designed to momentarily close said through-passage.

2. Metering unit according to claim 1, wherein the lower wall of the piston has a conical bore, the base of the cone being located on the side adjacent to the metering cavity.

3. Metering unit according to claim 1, wherein the metering cavity includes a breaker plate.

4. Metering unit according to claim 2, wherein the valve has a helical groove, said groove being dimensioned so as to contain and permit the flow of material.

5. Metering unit according to claim 4, wherein the valve has a groove of rounded cross section, composed of two successive portions.

6. Metering unit according to claim 1, wherein the piston has a helical groove placed on its external face.

7. Metering unit according to claim 6, intended for the manufacture of multilayer objects, said unit comprising several material feed ducts and a corresponding number of passages in the piston, the valve and the piston each having a groove.

8. Plastic metering system comprising a metering unit according to claim 1 and an accumulator having a duct placed so as to communicate with the material feed duct, the duct of the accumulator having an extrusion screw.

9. System according to claim 8, comprising means for moving the extrusion screw axially in the duct of the accumulator.

10. System according to claim 8, comprising a regulation piston placed so as to move in a cylinder placed transversely with respect to said duct of the accumulator.

11. Method using a metering unit as defined claim 1, wherein the following steps are carried out in succession:
   the material outlet orifice is opened by lowering the valve, which at the same time closes the through-passage;
   the piston is lowered and a dose of plastic is extracted through the material outlet orifice;
   the material outlet orifice is closed by raising the valve which simultaneously opens the through-passage;
   the piston is returned to its initial position by the inflow of pressurized material in the through-passage and by the filling of the metering cavity.

12. A metering unit according to claim 5, wherein the valve has a groove of rounded cross section, composed of two successive portions comprising a straight part and then a helix of decreasing depth.

* * * * *